UNITED STATES PATENT OFFICE.

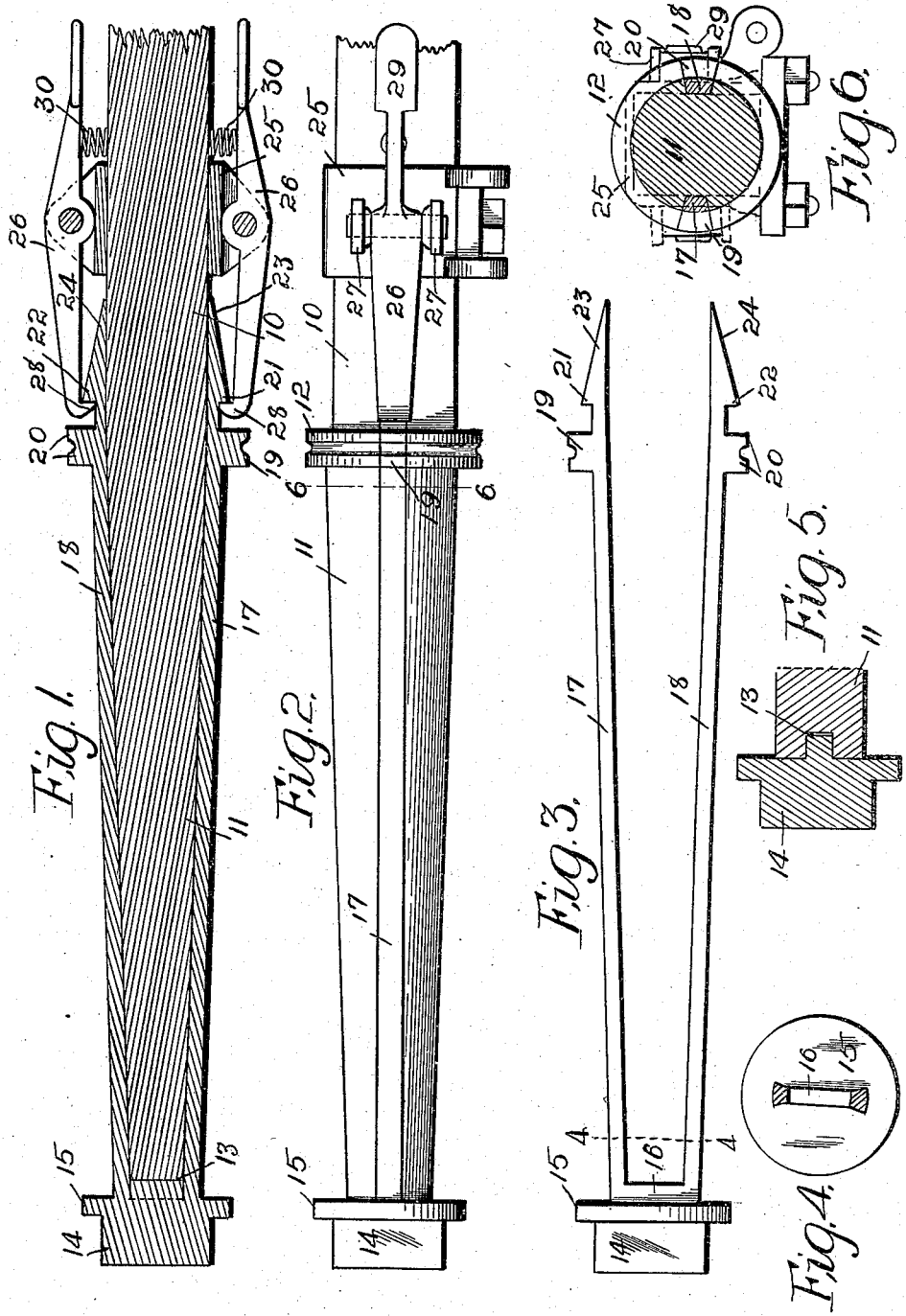

FRANCIS O. PATTEN, OF NORWALK, IOWA.

VEHICLE-WHEEL RETAINER.

937,171.  Specification of Letters Patent.  Patented Oct. 19, 1909.

Application filed January 27, 1908. Serial No. 412,816.

*To all whom it may concern:*

Be it known that I, FRANCIS O. PATTEN, a citizen of the United States, residing at Norwalk, in the county of Warren and State of Iowa, have invented a certain new and useful Vehicle-Wheel Retainer, of which the following is a specification.

The object of my invention is to provide a device of simple, durable and inexpensive construction, to take the place of the ordinary nut commonly used for securing the vehicle wheel to the axle.

More specifically, it is my object to provide a device of the class described, that may be quickly, and easily applied by simply pushing it into the wheel and through openings in the axle and permitting the automatic spring actuated clutch device to engage and permanently retain it therein, and further to provide a device of this kind that may be detached by simply grasping the spring actuated clutch and then bodily removing the wheel and the retainer, which retainer will then be held in the wheel so that it need not be touched by the operator, and so that the operator need not come in contact with lubricating oil, or grease, when removing or replacing a wheel.

My invention consists in certain details in the construction, arrangement and combination of the various parts of the device, whereby the objects contemplated are attained, as hereinafter more fully set forth, pointed out in my claims, and illustrated in the accompanying drawings, in which—

Figure 1 shows a central longitudinal sectional view through a vehicle axle, with my improved retainer applied thereto. Fig. 2 shows a side view of the same. Fig. 3 shows a top view of the retainer detached. Fig. 4 shows a sectional view on the line 4—4 of Fig. 3. Fig. 5 shows a sectional view of the outer end of the spindle and a part of the retainer. Fig. 6 shows a sectional view on the line 6—6 of Fig. 2.

Referring to the accompanying drawings, I have used the reference numeral 10 to indicate the axle which is preferably square in cross section. At the end of the axle is the tapered, rounded spindle 11 having an annular rim 12 between it and the axle. The outer end of the spindle is provided with a horizontal slot at 13, as shown in Fig. 5, and the sides of the spindle are provided with longitudinal grooves to receive the retainer hereinafter described. These grooves also extend through the rim 12.

The retainer proper comprises a head 14 having an annular rim 15 thereon, and a lug 16 at the inner face of the head designed to enter the groove 13. The body of the retainer comprises two members 17 and 18 shaped to enter the longitudinal grooves formed in the spindle. Near the inner ends of the parts 17 and 18 are the rim members 19 and 20 designed to fit into the notches in the rim 12, and when in position, to form a continuation of said rim. Beyond the rim members 19 and 20 are the shoulders 21 and 22, and beyond the shoulders, the members are tapered at 23 and 24. When the retainer is in position as shown in Fig. 2, the members 17 and 18 are flush with the surface of the spindle.

Mounted upon the axle 10 is a clip 25, and on both the front and rear surfaces of said clip, is a spring actuated clutch device comprising a lever 26 pivoted between the lugs 27 and having a hook 28 on its outer end to engage the shoulder 21 or 22, and having a handle 29 on its inner end, and an expansible coil spring 30 to normally elevate the handle portion. The hooks 28 are so arranged that when the retainer is moved to position, the inclined surfaces 23 will engage the ends of the hooks and elevate them until the hooks reach the shoulders 21 and 22, whereupon they will engage said shoulders as shown in Fig. 1, and firmly hold the retainer from outward movement on the spindle. Obviously, there can be no rotary movement of the retainer for the reason that it is held in longitudinal grooves in the spindle.

In practical use, the retainer is first placed within the hub of the vehicle wheel and then the retainer and wheel are jointly placed in position on the spindle with the retainer entering the grooves of the spindle, and they are moved inwardly far enough to be engaged by the clutch devices, whereupon, the vehicle wheel is firmly held upon the spindle. In order to remove it, the operator need only grasp the handles 29 and press them toward the axle, whereupon the vehicle wheel, together with the retainer, may be bodily removed, as the rim members 19 and 20 will hold it in position in the wheel so that the operator need not touch any of the parts that are likely to be covered with lubricating oil. Furthermore, the clip 25 may if desired, be used for other purposes, such for instance as attaching thills.

Having thus described my invention, what I claim and desire to secure by Letters Patent, is—

1. In a device of the class described, the combination of an axle, a spindle thereon, a rim at the inner end of the spindle, said spindle and rim being formed with longitudinal grooves, a retainer comprising a head at its outer end and two retainer members designed to enter the grooves in the spindle, and rim members thereon designed to enter the grooves in said rim and form a continuation of the rim, and means fixed to the axle for engaging said members.

2. In a device of the class described, the combination of an axle, a spindle thereon, a rim at the inner end of the spindle, said spindle and rim being formed with longitudinal grooves, a retainer comprising a head at its outer end and two retainer members designed to enter the grooves in the spindle, and rim members thereon designed to enter the grooves in said rim and form a continuation of the rim, means fixed to the axle for engaging said members, said means comprising a clip secured to the axle, a lever at the side of the clip having a hook on its inner end designed to engage a part of one of the retainer members, and a spring for normally holding said lever in said position.

3. In a device of the class described, the combination of an axle, a spindle thereon, a rim between the axle and spindle, said spindle and rim being formed with longitudinal grooves in its sides, said spindle also being formed with a groove at its outer end, a retainer comprising a head, a lug at the inner portion of the head to enter the groove at the outer end of the spindle, two retainer members fixed to the head, each designed to rest in one of the grooves in the spindle, and each having a rim member projecting from it and designed when in position to form a continuation of said rim, and each also having a shoulder and an inclined portion at its inner end, a clip secured to the axle, a spring actuated clutch device on the front and on the rear of said clip, each clutch device comprising lugs on the clip, a lever pivoted to said lugs, a hook at the outer end of the lever, a handle at the inner end of the lever, and a spring at the inner end for holding the hook in engagement with the retainer members.

Des Moines, Iowa, Nov. 30, 1907.

FRANCIS O. PATTEN.

Witnesses:
GEO. F. STEPHENS,
FRANK KELLAR.